(12) United States Patent
Halash et al.

(10) Patent No.: US 9,495,959 B2
(45) Date of Patent: Nov. 15, 2016

(54) DISAMBIGUATION OF DYNAMIC COMMANDS

(71) Applicant: Ford Global Technologies, LLC, Dearborn, MI (US)

(72) Inventors: Elizabeth Halash, Dearborn, MI (US); Stefan Bankowski, Royal Oak, MI (US); Louis Vincent Bellanca, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 14/191,833

(22) Filed: Feb. 27, 2014

(65) Prior Publication Data

US 2015/0243283 A1    Aug. 27, 2015

(51) Int. Cl.
*G10L 15/19* (2013.01)
*G10L 17/22* (2013.01)
G10L 15/26 (2006.01)
G10L 15/22 (2006.01)

(52) U.S. Cl.
CPC .............. *G10L 15/19* (2013.01); *G10L 17/22* (2013.01); *G10L 15/26* (2013.01); *G10L 2015/223* (2013.01)

(58) Field of Classification Search
CPC ...................................................... G10L 15/19
See application file for complete search history.

(56) References Cited

U.S. PATENT DOCUMENTS

| | | |
|---|---|---|
| 6,230,138 B1 | 5/2001 | Everhart |
| 7,904,300 B2 | 3/2011 | Abbott et al. |
| 2004/0139049 A1* | 7/2004 | Hancock et al. ................. 707/1 |
| 2004/0260562 A1* | 12/2004 | Kujirai ............... G01C 21/3608 |
| | | 704/275 |
| 2010/0241431 A1 | 9/2010 | Weng et al. |
| 2014/0244259 A1* | 8/2014 | Rosario et al. ............... 704/254 |
| 2014/0358553 A1* | 12/2014 | Helmke .................. G10L 15/22 |
| | | 704/275 |

FOREIGN PATENT DOCUMENTS

WO    WO 2013/101051    *    7/2013

* cited by examiner

*Primary Examiner* — Qian Yang
(74) *Attorney, Agent, or Firm* — Frank MacKenzie; Bejin Bieneman PLC (57) ABSTRACT

A first computing device registers a first grammar that is stored in a persistent memory of the first computing device and that is a system grammar of the first computing device. The first computing device further registers at least one second grammar associated with an application stored in at least one second computing device. Input including may be received. The first grammar is selected for the command upon a determination that the input is specified as a command in each of the first grammar and the second grammar.

14 Claims, 5 Drawing Sheets

DISAMBIGUATION OF DYNAMIC COMMANDS

BACKGROUND

A first computing device may be configured to receive input including commands to be executed by the computing device and/or one or more second computing devices. However, commands that may be received by the first computing device and one or more of the second computing devices may collide or conflict. Unfortunately, mechanisms are lacking for handling such conflicts. Indeed, mechanisms are generally lacking for handling, e.g., prioritizing, conflicting grammars.

DETAILED DESCRIPTION

System Overview

Figure 1:
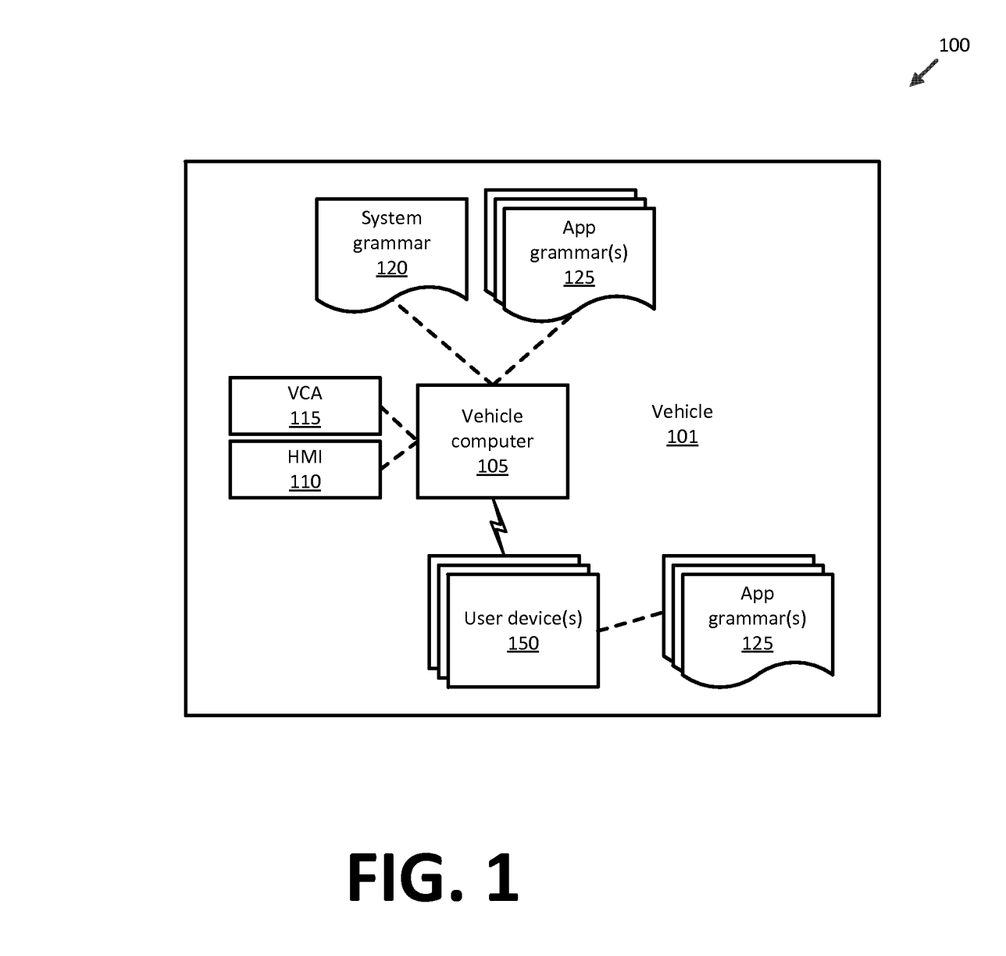
FIG. 1 is a block diagram of an exemplary system for managing multiple devices.

FIG. 1 is a block diagram of an exemplary system 100 for managing multiple devices 150 that are communicatively coupled to a central computer 105. The devices 150 are generally proximate to one another, e.g., included in a common location such as a room in a building or, in one exemplary implementation, a vehicle 101. For example, in one exemplary implementation, the devices 150 are all sufficiently proximate to the central computer 105 so that low-power wireless communications, e.g., using a known technology such as Bluetooth or the like, are possible between the devices 150 and the computer 105.

The computer 105 generally includes a human machine interface (HMI) 110 for providing output, e.g., text, images, sound, etc., to a user, as well as for receiving user input, e.g., via voice command, selection on an input device such as a touchscreen, etc. In one exemplary implementation a user provides verbal, i.e., sound, input to the computer 105 via the HMI 110. A voice control application (VCA) 115, executed by a processor of the computer 105, detects and interprets the verbal input according to a system grammar 120 and/or one or more application grammars 125.

However, various grammars 120, 125 may include similar or identical words and/or phrases used to provide commands to the computer 105, one or more devices 150, and/or one or more applications running on a computing device 105 or 150. Accordingly, the computer 105 may be configured, as described in detail below, to identify application grammars 125, and to resolve conflicts between the computer 105 system grammar 120 and one or more application grammars 125, as well as conflicts that may arise between application grammars 125. Further, the computer 105 may be configured, in the case where a command is included in multiple grammars 120, 125, to identify a device 150 to which the command is to be directed.

Exemplary System Elements

A central computer 105, e.g., included in a vehicle 101, generally includes a processor and a memory, the memory including one or more forms of computer-readable media, generally including volatile and non-volatile memory, and storing instructions executable by the processor for performing various operations, including as disclosed herein. The memory of the computer 105 further generally stores instructions, executable by the processor of the computer 105, comprising the VCA 115. In addition, the computer 105 memory generally includes a system grammar 120, as well as one or more application grammars 125 for one or more applications included in the computer 105. In addition, the computer 105 memory, e.g., a volatile or non-permanent or non-persistent memory, may store one or more application grammars 125 received from one or more devices 150.

Accordingly, the computer 105 is configured, as described further below, to receive the one or more application grammars 125, to determine whether grammars 120, 125 conflict, and/or to resolve conflicts arising when the computer 105 receives a command, e.g., via the HMI 110 interpreted by the VCA 115, where the command may be interpreted according to more than one of the grammars 120, 125.

The computer 105 is generally configured for communications on a controller area network (CAN) bus or the like. In addition, the computer 105 may be configured for communicating with one or more devices 150, e.g., via various wired and/or wireless networking technologies, such as Bluetooth, a universal serial bus (USB) or micro-USB cable, etc. Further, the computer 105 may include, or may be coupled to, the HMI 110.

In general, the HMI 110 receives input provided to the computer 105, and displays output. An HMI 110 may include a variety of mechanisms, e.g., an input device such as a touchscreen, keyboard, keypad, microphone, etc. Further, an HMI 110 generally includes output mechanisms such as a display screen, speakers, etc.

The VCA 115 may be used to interpret or decode sounds to identify phonemes or the like, and words therefrom, that may be a command or commands for software application executed on the computer 105 and/or one or more user devices 150. In general, the VCA 115, along with an event monitor or the like for detecting and receiving audio input, executes as a continuous or background process in the computer 105. That is, mechanisms are known for detecting and parsing, interpreting, or decoding audio input.

Once the VCA 115 has determined a word or words provided as a command to the computer 105, a grammar 120, 125 may be used to determine an action to be taken based on the command. Exemplary data that may be included in a grammar 120, 125 is shown below in Tables 1 and 2, respectively. Examples of a grammar 120, 125 being used to interpret a command include a command being interpreted to cause execution of a particular application on a particular device 150, to take an action via the computer 105, e.g., to place a phone call, change a radio station, adjust a vehicle 101 climate control, instantiate an application, etc. Further, as discussed above, a command may be duplicated in multiple grammars 120, 125, wherein the computer 105 is configured to determine which of the possible grammars 120, 125 to apply to determine an action to be taken based on the command.

In general, the term "grammar" as used herein includes a definition of a set of permissible commands for a software application, such as an application executed on a device 150, or a background or monitoring application executed on the computer 105, e.g., that receives input, e.g., voice commands, via the HMI 110 and interpreted by the VCA 115. Accordingly, a grammar 120, 125 may include a set of rules for parsing voice commands, and for assigning a voice command to an action in computer software, e.g., to instantiate an application, to take an action e.g., in a music application to play, pause, resume, etc. In some cases rules in a grammar 120 may simply identify a set of commands, e.g., single words or phrases, and respective actions associated with each of the commands. More complex grammars are possible, e.g., where a rule specifies that a first word signifies a first meaning, e.g., is associated with a first action, if followed by a second word, and a second meaning, e.g., is associated with a second action, if followed by a third word.

The system grammar 120 is generally stored in a persistent and/or non-volatile memory of the computer 105. The system grammar 120 is used to determine an action or actions to be taken in or by the computer 105 based on certain commands as specified in the grammar 120. The grammar 120 is referred to as a system grammar 120, or "system-level" because it applies to commands applied to an operating system, background event handler, or the like, running on the computer 105, as opposed to an application or applications running on the computer 105 and/or one or more devices 150. Certain of the commands in a grammar 120 may be reserved for the grammar 120. That is, if a command in a grammar 120 is reserved, even if that command appears in a grammar 125 for an application, the command will be interpreted as a system-level command for the computer 105.

An application grammar 125 may be included in instructions and/or data that comprise an application stored in and executed on a device 150 or the computer 105. Accordingly, an application grammar 125 pertains to a single application executed on the computer 105 or a device 150. An application grammar 125, or a portion thereof, may be provided to the computer 105, whereby the computer 105 can determine when commands in the application grammar 125 are invoked, and can resolve conflicts that may arise between the system grammar 120 and an application grammar 125, or between a first application grammar 125 and one or more second application grammars 125.

Accordingly, in addition to storing grammars 120, 125, a memory of the computer 105 generally stores rules for selecting a device and/or application to receive a command, and for prioritizing and/or resolving conflicts between devices, applications, and/or grammars 120, 125. Examples of data used to specify such rules are provided below in Tables 1-4.

A user device 150 may be any one of a variety of computing devices including a processor and a memory, as well as communication capabilities. For example, the user device 150 may be a portable computer, tablet computer, a smart phone, etc. that includes capabilities for wired or wireless communications, for example, using IEEE 802.11, Bluetooth, and/or cellular communications protocols, USB (Universal Serial Bus), micro USB, etc. Further, the user device 150 may use such communications capabilities to communicate via the vehicle network mentioned above and also directly with a vehicle computer 105, e.g., using Bluetooth.

Exemplary Data

As mentioned above, one or more computer readable media, e.g., volatile and/or non volatile, persistent and/or non persistent, etc. may be used by the computer 105 to store various data. For example, the computer 105 may store grammars 120, 125.

A portion of an exemplary grammar 120 is provided below in Table 1.

TABLE 1

| Command ID | Command | Explanation |
|---|---|---|
| 1 | "Dial <10 digit phone number>" | Dial a requested phone number using a telephone device 150 connected to the computer 105 |
| 2 | "Radio off" | Turn off a radio controlled by the computer 105 |
| 3 | "Navigate to <street street address>" | Determine a route to the specified address in a navigation module included in the computer 105 |
| 4 | "<App name>" | Activate an application having the specified name |
| 5 | "Quit <App name>" | End execution of an application having the specified name |

A portion of an exemplary grammar 125 is provided below in Table 2.

TABLE 2

| Command ID | Command | Explanation |
|---|---|---|
| 10 | Play <song name> | Play a song having the requested name |
| 11 | "Pause" | Pause playback of audio content |
| 12 | "Last track" | Skip playback to a previous track |
| 13 | "Next track" | Jump playback to a next track |

The computer 105 may keep track of applications that may be executed in the computer 105 and/or one or more devices 150. Table 3 below provides an example of data that may be maintained by a computer 105 to identify and track applications.

TABLE 3

| AppId | AppName | AppState | GrammarID | Device Name |
|---|---|---|---|---|
| 175 | Traffic | 1 | 17 | Lou's Phone |
| 245 | Pandora | 1 | 231 | Stefans iPOD |
| 242 | Slacker | 2 | 323 | Bobs USB |
| 239 | Weather | 1 | 6543 | Eds iPOD |
| 240 | Stitcher | 2 | 2314 | My Device |
| 241 | BioCycle | 2 | NULL | My Device |
| 246 | Pandora | 1 | 231 | Central computer |

The AppID column provides an identifier for each application registered, the AppName column providing the name of each respective application. Note that an application name may be repeated, because a same application may be included on more than one device 150 and/or the central computer 105 and one or more device 150. The GrammarID, i.e., grammar identifier, provides an identifier for the system grammar 120 or an application grammar 125. Accordingly, another table or data structure in the computer 105 could associate respective grammar identifiers with tables or other data structures storing respective grammars 120, 125. In general, data such as shown in Table 3 can accordingly be used to identify possible grammars 120, 125 to be invoked when a command is received, e.g., to instantiate an application, or to perform some operation in the computer 105 or a device 150, e.g., via an application.

The computer 105 may further store data reflecting a status of an application with respect to a user interface, e.g., the HMI 110. For example, the computer 105 could maintain in memory a table having an AppID column, e.g., the AppID shown in Table 3 above, whereby the computer 105 may associate an application status shown in an application table or data structure with an application about which data is maintained in a table or data structures such as shown in Table 3. Further, the computer 105 could include a column indicating an "HMI Level" or "HMI Status" or the like, i.e., associating an AppID with an HMI Level. Table 4 below provides an example of an HMI Level table.

TABLE 4

| AppId | HMILevel |
|-------|----------|
| 175   | 3        |
| 245   | 2        |
| 242   | 0        |
| 239   | 1        |
| 240   | 1        |
| 241   | 0        |

In general, an HMI Level or Status could have any one of a variety of values, e.g., in one implementation, a value of 0 or no means that an application has not been started or instantiated, e.g., is not running at all in the computer 105 or a device 150. A value of 1 could mean that the application is running in the background, i.e., has been started, but is neither receiving input nor providing output via the HMI 110. A value of 2 could mean that the application has a limited status, e.g., is providing limited output such as audio, but not output on a display screen of the HMI 110, or if output is provided on the display screen of the HMI 110, the output is limited to a status bar, icon, or the like. A value of 3 could mean that the application has a full, or high-level, status, e.g., is providing output via multiple mechanisms of the HMI 110, e.g., video and audio. In one implementation, only one application at a time they be at a "full" level, and likewise only one application anytime may be at a "limited" level, while multiple applications could be at a "background" level. However, it is also possible that multiple applications be at a limited level at one time, or even that multiple applications be at a full level at one time.

Exemplary Process Flows

Figure 2:
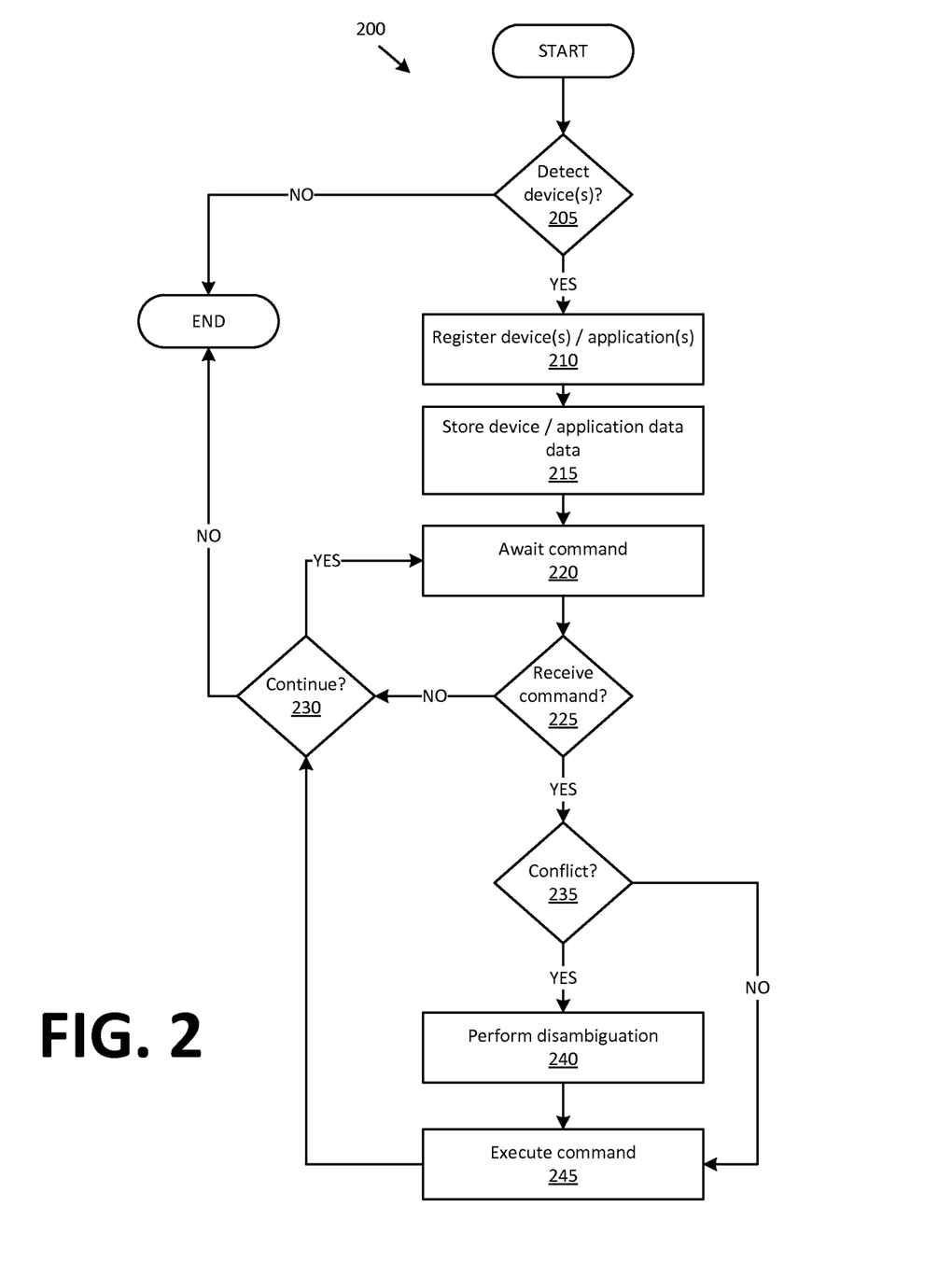
FIG. 2 is a diagram of an exemplary process for disambiguating commands received in a central computing device.

FIG. 2 is a diagram of an exemplary process 200 for disambiguating commands received in a central computing device. The process 200 begins in a block 205, in which the computer 105, e.g., upon being powered on, determines whether one or more devices 150 are detected. For example, has mentioned above, a Bluetooth connection or the like may be detected, and/or a device 150 may be physically connected, e.g., via a USB or micro-USB connection or the like, to the computer 105. If no devices 150 are detected, then the process 200 ends. Otherwise, the process 200 proceeds to a block 210.

In the block 210, the computer 105 registers each of the devices detected in the block 205. For example, the computer 105 may maintain a table or other data structure identifying detected devices 150, using a device identifier such as a device name as shown in Table 3 above, etc. Further, the computer 105 generally determines an application or applications running and/or available to be run on each device 150. Such determination generally includes obtaining an application name that may be stored, along with a unique or substantially unique identifier generated by the computer 105, e.g., as shown above in Table 3. The process 200 then proceeds to a block 215.

Figure 3:
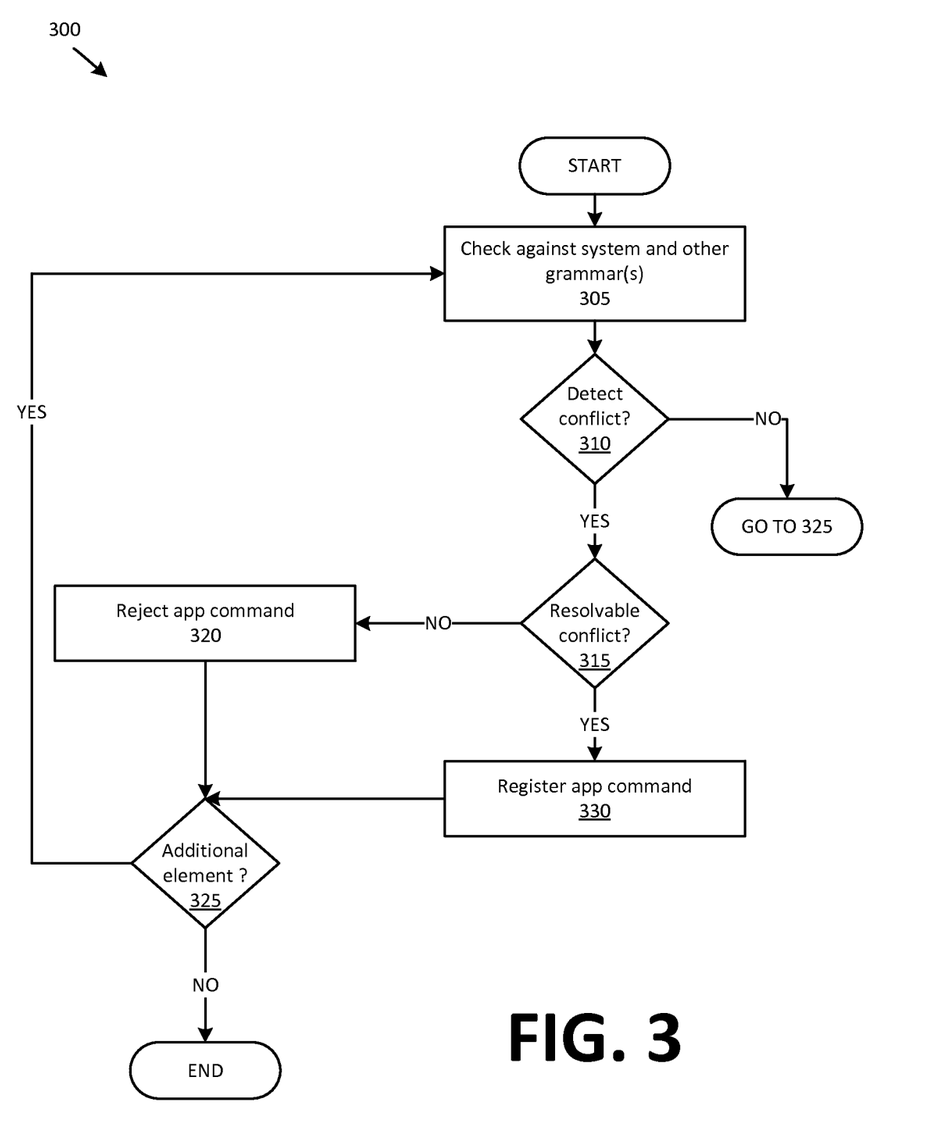
FIG. 3 is a diagram of an exemplary process for registering an application grammar in in a central computer that is configured to manage multiple devices.

In the block 215, the computer 105 stores data relating to devices and/or applications registered as discussed above with respect to the blocks 205, 210. For example, a grammar 120 is persistently stored in the computer 105, as discussed above, but one or more grammars 125 may be provided to the computer 105, e.g., in the block 210, based at least in part on a device or devices 150 identified in the block 205. Accordingly, one or more grammars 125 may be registered and at least temporarily stored in a memory of the computer 105 based on a device or devices 150 and/or applications on a respective device 150. Further, the computer 105 may store data concerning devices 150, applications respectively thereon, grammars 120, 125 respectively applicable to applications on the computer 105 or a device 150, etc., e.g., as illustrated above in Table 3. FIG. 3, discussed in detail below, illustrates an exemplary process 300 by which elements of a grammar 125 may be registered by the computer 105.

In the block 220, the computer 105 awaits a command via the HMI 110, e.g., a voice command. The VCA 115 may run as a background process in the computer 105, checking to determine if a voice command is received, and interpreting the command, e.g., using known speech recognition techniques, as described above. Accordingly, in the block 225, the computer 105 determines whether a command has been received. If not, the process 200 proceeds to a block 230. If so, the process 200 proceeds to a block 235.

In the block 230, the computer 105 determines whether the process 200 should continue. For example, the process 200 could be terminated because the computer 105 is powered off, because no devices 150 are detected, etc. If the process 200 should not continue, then the process 200 ends. Otherwise, the process 200 returns to the block 220. It should be noted, that the computer 105 could detect an additional device 150, in which case, although not shown in FIG. 2, the process 200 could return to the block 210. Further, the computer 105 could detect that a previously-detected device 150 was no longer detected, in which case, the computer 105 could remove the no-longer-detected device 150, as well as records of applications thereon and associated grammars 125, from data that was stored as described above.

The block 235 may follow the block 225. In the block 235, the computer 105 determines whether a conflict, e.g., an ambiguity, exists with respect to the received command. For example, the received command may request execution of an application found on more than one device 150, or on the computer 105 and at least one device 150. Further for example, the received command may be found in more than one grammar 120, 125. Accordingly, before the received command can be executed, the computer 105 must determine a device 150 on which the command is to be executed and/or a grammar 120, 125 according to which the command is to be executed. Note that in some implementations, certain commands may be reserved by a grammar 120 of the computer 105, whereby, even if such command presents ambiguity, the ambiguity will be ignored by the computer 105, and a grammar 120 will be followed. In any case, if an ambiguity exists with respect to the received command, then a block 240 is executed next. Otherwise, the process 200 proceeds to a block 245.

In a block 240, which may follow the block 235, the computer 105 disambiguates the received command. Exemplary processes by which a command may be disambiguated are discussed below with respect to FIGS. 3, 4, and 5.

Following the block 235 or the block 240, in a block 245, the computer 105 causes execution of the received command. For example, the command may be provided to an appropriate device 154 execution in an application, for instantiation of an application, etc. Alternatively, the command may be provided to a processor application in the computer 105. Following the block 245, the process 200 returns to the block 230.

FIG. 3 is a diagram of an exemplary process 300 for registering an application grammar in in the central computer 105 that is configured to manage multiple devices 105. The process 300 begins in a block 305, in which an element of the grammar 125 is checked against the system grammar of the computer 105, and one or more other grammars 125 from other devices 105, if any.

Next, in a block 310, the computer 105 determines whether any conflict or ambiguity exists between the element of the grammar 125 check in the block 305, and any other grammar 120, 125. For example, the element may be a command that also appears in another grammar 120, 125, may be a name of an application on multiple devices 125, etc. In any event, if no conflict is detected, then the process 300 proceeds to a block 325, discussed below. However, if a conflict or ambiguity is detected, then a block 315 is executed next.

In the block 315, the computer 105 determines whether the detected conflict can be resolved. For example, if a word or phrase in a grammar 125 conflicts with a reserved word or phrase in the computer 105 system grammar 120, the conflict cannot be resolved. Put another way, a word or phrase in a grammar 125 that matches a word or phrase in a system grammar 120 is not allowed, and cannot be considered, by the computer 105 when input is received, e.g., via the VCA 115. If the conflict cannot be resolved, then the block 320 is executed next. Otherwise, a block 330 is executed next.

In the block 320, the computer 105 rejects the conflicted command from the grammar 125. For example, the computer 105 may simply not register or recognize the command. Following the block 320, the process 300 proceeds to a block 325.

In the block 325, the computer 105 determines whether the grammar 125 being checked has further elements, e.g., words or phrases used for commands, to be checked. If so, the process 300 returns to the block 305. Otherwise, the process 300 ends following the block 325.

In the block 330, which may follow the block 315 as described above, the computer 105, having determined in the block 315 that a conflict that was detected in the block 310 could be resolved, registers the command. For example, the command could be stored in a memory of the computer 105 as described with respect to one or more of the tables above. Following the block 330, the process 300 proceeds to the block 325.

Figure 4:
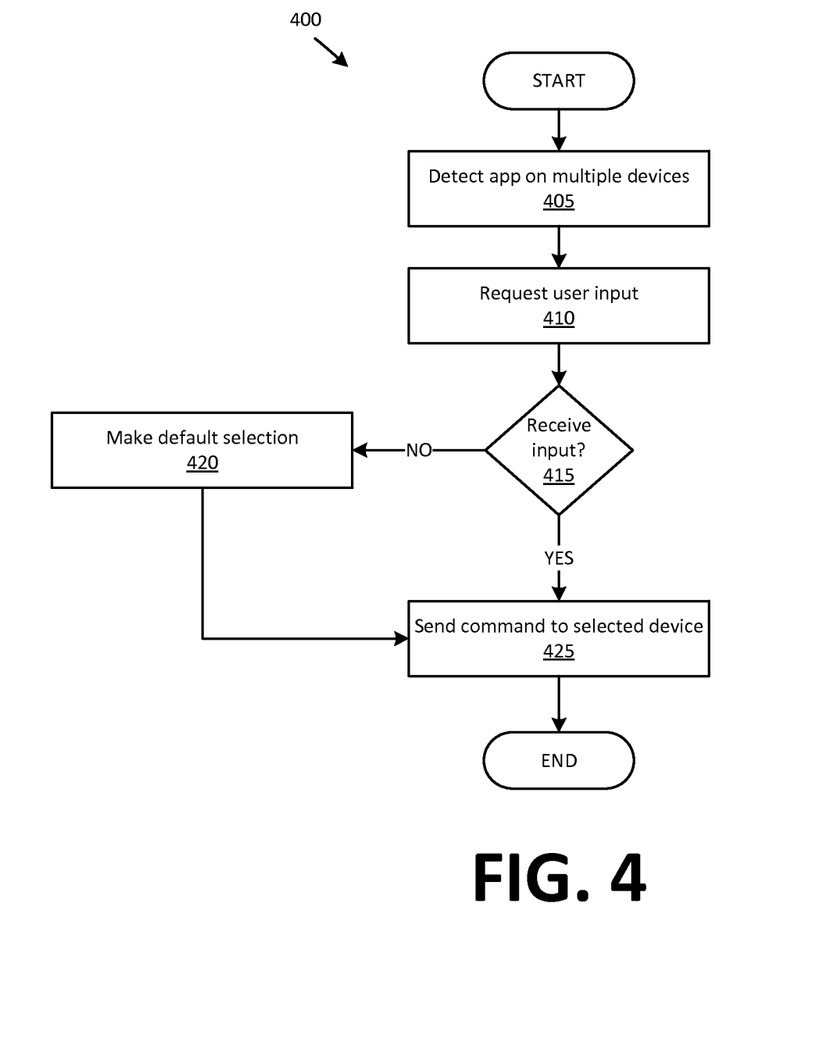
FIG. 4 is a diagram of an exemplary process for selecting a device to execute a command received in a central computer that is configured to manage multiple devices.

FIG. 4 is a diagram of an exemplary process 400 for selecting a device to execute a command received in a central computer that is configured to manage multiple devices. The process 400 begins in a block 405, when the computer 105 receives a command that is determined to request access to an application having instances on multiple respective devices 150 and/or the computer 105. For example, the computer 105 could receive a command for "Pandora," where an application of that name is included on the computer 105 as well as a device 150. Likewise, the "Pandora" application could be included on two, three, etc., devices 150.

Next, in a block 410, the computer 105 requests user input concerning which instance of the requested application should be accessed, generally which computing device 105, 150 should be accessed. For example, the computer 105 could provide an audio message asking the user to speak a name of the device, to speak a number for respective devices, etc. alternatively or additionally, the computer 105 could display a list of devices on a touchscreen or the like for user selection, e.g., as shown in Table 5; such selection could be by speaking a name or number of the device as explained above, or by touching a name or number of the desired device.

| Device No. | Name |
|---|---|
| 1 | Vehicle computer |
| 2 | Bob's iPod |
| 3 | Mary's Android phone |
| 4 | Jill's iPad |

Following the block 410, in a block 415, the computer 105 determines whether the input requested in the block 410 has been received, e.g., the computer 105 may be configured with a timeout period or the like, e.g., 15 seconds 30 seconds, one minute, etc., in which a user is expected to provide the input. If the input is not received, e.g., with any timeout period, then the process 400 proceeds to a block 420. Otherwise, input specifying a device on which an application is to be accessed is received, and the process 400 proceeds to a block 425.

In the block 420, the computer 105 makes a default selection of a computing device 105, 150 on which an application is to be accessed. For example, the computer 105 may use itself as the default selection. Alternatively or additionally, a user may specify a device 150 to be used by default. In any event, following the block 420, the process 400 proceeds to a block 425.

In the block 425, the computer 105 provides a command to access the requested application to a device specified in one of the blocks 415, 420, as described above. Following the block 425, the process 400 ends.

Figure 5:
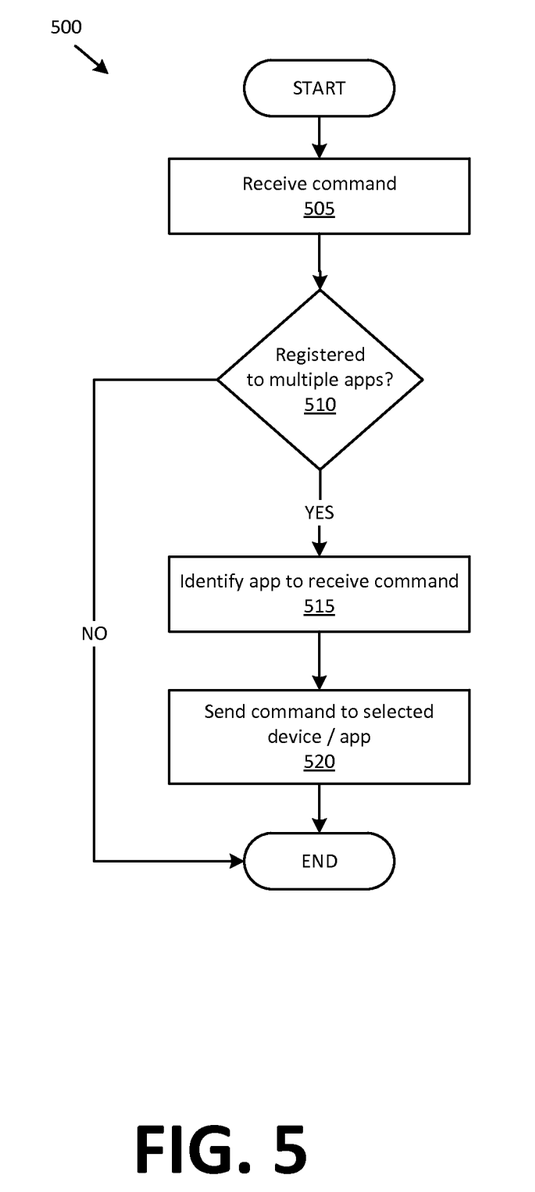
FIG. 5 is a diagram of an exemplary process for selecting an instance of an application to execute a command received in a central computer that is configured to manage multiple device.

FIG. 5 is a diagram of an exemplary process 500 for selecting an instance of an application to execute a command received in a central computer that is configured to manage multiple devices. The process 500 begins in a block 505, in which the computer 105 receives a command, e.g., via the HMI 110 in the VCA 115 as described above.

Next, in a block 510, the computer 105 determines whether the command received in the block 505 is registered to multiple applications on one or more computing devices 105, 150. If not, the process 500 ends. Otherwise, control proceeds to a block 515.

In the block 515, the computer 105 identifies an application to receive the command. For example, the computer 105 may use a table or other data structure similar to that illustrated above with respect to Table 4. That is, the computer 105, having identified two or more applications associated with grammars 120, 125 including the requested command, then prioritizes the two or more applications. For example, an HMI status or level or the like, such as discussed above concerning Table 4, may be identified for each application. An application having an HMI level with highest priority may then be selected to receive the command.

Next, in a block 520, the computer 105 sends the command requested in the block 505 to the application determined in the block 510, e.g., in the computer 105 or a device 150. Following the block 520, the process 500 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer, the computer comprising a processor and a memory, wherein the computer is configured to:
   register each of a plurality of application grammars, and further wherein registering an application grammar includes determining whether a command in the application grammar conflicts with a command in another grammar registered in the computer;
   receive input including at least one word;
   determine that the input is specified as a command in a plurality of the grammars, each of the grammars being associated with a respective instance of one application in a plurality of instances of the application each currently running on one of a plurality of devices;
   select one of the currently-running instances of the application to which to apply the command according a specified status of the selected instance of the application; and
   provide the command to the selected one of the applications.

2. The system of claim 1, wherein each of the plurality of devices is a computing device that is separate from the computer.

3. The system of claim 2, wherein the computer is further configured to select one of the computer and one of the separate devices to receive the command based on user input.

4. The system of claim 1, wherein the input is voice input.

5. The system of claim 1, wherein the computer is in a vehicle.

6. The system of claim 1, wherein the computer is further configured to reject a command included in an application grammar when the command in the application grammar is reserved by a system grammar.

7. The system of claim 1, wherein the computer is further configured to specify the status based on a device associated with the currently-running instance.

8. A method implemented in a computer, comprising:
   registering each of a plurality of application grammars, wherein registering an application grammar includes determining whether a command in the application grammar conflicts with a command in another grammar registered in the computer;
   receiving input including at least one word;
   determining that the input is specified as a command in a plurality of the grammars, each of the grammars being associated with a respective instance of one application in a plurality of instances of the application each currently running on one of a plurality of devices;
   selecting one of the currently-running instances of the application to which to apply the command according a specified status of the selected instance of the application; and providing the command to the selected one of the applications.

9. The method of claim 8, wherein each of the plurality of devices is a computing device that is separate from the computer.

10. The method of claim 9, wherein the computer is further configured to select one of the computer and one of the separate devices to receive the command based on user input.

11. The method of claim 8, wherein the input is voice input.

12. The method of claim 8, wherein the computer is in a vehicle.

13. The method of claim 8, further comprising rejecting a command included in an application grammar when the command in the application grammar is reserved by a system grammar.

14. The method of claim 8, wherein the status is specified based on a device associated with the currently-running instance.

* * * * *